3,050,369
RECOVERY OF IODINE FROM AQUEOUS IODIDE SOLUTIONS

Jack F. Mills, Midland, Mich., assignor to The Dow Chemical Company, Midland, Mich., a corporation of Delaware
No Drawing. Filed Mar. 7, 1960, Ser. No. 12,932
6 Claims. (Cl. 23—216)

This invention concerns a novel method for recovering iodine from aqueous iodide solutions, particularly iodide-containing salt brines, by contacting an aqueous iodide solution with a polyhalide anion exchange resin and treating the resulting polyiodide resin to recover available reactive iodine.

The novel polyhalide anion exchange resins used in the process of this invention to oxidize iodide to free iodine and to react with such liberated iodine to form polyiodide resins from which iodine can be recovered are the reaction products either of (1) any strongly basic quaternary ammonium exchange resin, for example, Dowex® 1, Dowex 2, Dowex 11, Dowex 21A, as described in U.S. Patents 2,591,573 and 2,614,099, in the chloride, bromide or iodide form with excess chlorine and/or bromine to form a polyhalide resin, e.g., of the tribromide, chlorobromate, chloroiodate I, chloroiodate III and bromochlorate type or (2) any weakly basic polyamine anion exchange resin, for example, as described in U.S. Patent 2,591,574, such as Dowex 3 resin in the chloride, bromide or iodide form with excess chlorine and/or bromine to form resin polyhalides having anions of the type discussed under (1) above.

The starting polyhalide resins may be prepared by the method of Breston and Everest, Chem. and Ind., September 14, 1957. The polyhalide anion, $X_n^-$, wherein X represents one or more of chlorine, bromine and iodine, no more than one halogen atom of which is iodine, and $n$ represents an integer from 3 to 7, thus can be $Br_3^-$, $ClBr_2^-$, $BrCl_2^-$, $Cl_2I^-$, $Cl_4I^-$, $ClBr_4^-$, $ClBr_6^-$, etc., the amount of added halogen being regulated by the proportion of halogen and anion exchange resin reacted. The reaction can be facilitated by using an aqueous solution containing the halogen and its corresponding alkali metal halide in place of the halogen alone.

The anion exchange resins used for making the polyhalide anion exchange resins utilized in this invention are the well-known polymeric vinylbenzyl quaternary ammonium chloride, bromide or iodide strongly basic anion exchange resins, exemplified by the Dowex 1, 2, 11 and 21A resins which may be crosslinked with from about 1 to 16 weight percent of the usual diethylenic-unsaturated crosslinking agents, e.g., divinylbenzene, divinyltoluene, diacrylic esters and the like. Also, the well-known polyamine resins having a polymeric vinylbenzyl backbone or matrix and substituent polyamine groups of the primary and secondary amine types, exemplified by Dowex 3 resins, are operable for making the polyhalide anion exchange resins useful in the instant case. These resins, too, may be from 1 to 16 percent crosslinked.

Any aqueous solutions of simple iodide salts having sufficient iodine to be economically recoverable can be processed for the recovery of iodine by the practice of this invention, e.g., sea-water, brinewell solutions containing iodine, oil well salt brines containing iodine, aqueous waste solutions containing iodine having 0.005 or higher weight percent iodine. Of the aqueous brine solutions, oil well salt brines and concentrates thereof are preferred since they contain higher proportions of iodine. Other accompanying brine salts do not interfere. If the pH of any such solution is greater than about 10, it should be reduced by adding mineral acid to a pH of about 10 so as not to interfere with the resin polyiodide formation.

In practice, aqueous iodide solution is contacted with a water-immersed polyhalide anion exchange resin, as set forth above, advantageously at a temperature from about 10°–40° C. Thereby iodine is liberated by oxidation of iodide of the aqueous iodide solution, the available reactive halogen (chlorine or bromine) of the polyhalide anion exchange resin acting as oxidant. The available reactive halogen is that halogen in excess of the starting conventional halide form of the quaternary ammonium or polyamine resins. A representative reaction involved in the process can be diagramed as follows:

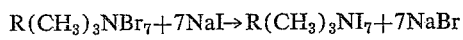

$R(CH_3)_3NBr_7 + 7NaI \rightarrow R(CH_3)_3NI_7 + 7NaBr$ wherein R represents a combined vinylbenzyl moiety of the resin matrix. The intermediate reaction outlined above involves oxidation of iodide by the available reactive bromine. The liberated iodine then displaces the corresponding $Br_7^-$ to form the $I_7^-$ polyiodide ion. The available reactive iodine is then recovered therefrom by a chemical or physical solvent, such as ethanol, acetone, aqueous sodium hydroxide, aqueous sodium bisulfite, etc.

The following specific embodiments and the best mode contemplated for carrying out the invention are exemplified in the following representative examples.

Example 1

A salt brine solution was made up of the following solutes dissolved in one liter of distilled water:

29 g. sodium chloride
250 mg. sodium bromide
100 mg. potassium iodide
600 mg. sodium bicarbonate
1 g. calcium chloride
700 mg. magnesium chloride About 500 ml. of the above solution was passed through a ½ by 10 inch column containing Dowex 1–8X resin, 50–100 mesh, bromochlorate, $Br_2Cl^-$ (about 40 percent active in bromine). The X designation indicates the percent crosslinkage, e.g., 8X is 8 percent crosslinked, divinylbenzene being the crosslinking agent unless otherwise indicated. This resin was prepared by reacting the reaction product of trimethylamine and an insoluble chloromethylated copolymer of approximately 87.5 weight percent styrene, 4.5 weight percent ar-ethylvinylbenzyl and 8 percent divinylbenzene (Dowex 1 resin) with bromine in an aqueous mixture of sodium bromide and bromine sufficient to form the bromochlorate. A ⅛–¼ inch band of the black polyiodide resin formed at the top of the column. Analysis of the residual brine solution which had passed through the column showed no detectable iodide ion or free iodine. It was noted that the brine solution had picked up approximately 80 p.p.m. of free bromine. However, when the brine solution was fed directly from the orange bromochlorate resin into a bed of Dowex 1–8X chloride, all the free bromine picked up by the residual brine solution was removed by forming bromochlorate resin. Only a small amount of acid (0.015 percent) was detectable in the residual brine solution passing through a two layer (double) resin bed. Multiple columns, e.g., 2 or 3, of conventional anion exchange resin can be alternated to avoid bromine loss and to maintain a continuous process.

An aqueous solution containing 15 weight percent of sodium bromide and 10 percent bromine was used simultaneously to regenerate the polyiodide resin to its conventional halide form and to remove the iodine. Iodine crystallized out and was removed from the effluent solution, leaving sodium bromide-bromine solution containing some iodine for recycling.

Example 2

About 500 ml. of the salt brine solution described in Example 1 was passed through a ½ x 10 inch column packed with yellow Dowex 1-2X, 50-100 mesh, chloroiodate III (Cl$_4$I$^-$) resin. Along with the complete removal of iodine to form triiodide polyhalide resin, the results were substantially identical to those described in Example 1.

Example 3

A column containing 10 grams of Dowex 1-2X, 50-100 mesh triiodide resin (40 percent iodine) formed as described in Example 2, was eluted with 200 ml. of aqueous one percent sodium hydroxide. All the iodine was removed as sodium iodide. The resin was thereby regenerated to simple iodide form. The recovery of sodium iodide corresponded to 4.0 grams iodine. The iodine can be recovered from the sodium iodide in conventional ways.

Example 4

The procedure of Example 2 was repeated with a bed of Dowex 3-8X, 20-50 mesh, polyamine anion exchange resin in the hydrobromochlorate form, —NH$_3$—Br$_2$Cl. The results were similar to those of Example 2.

The Dowex 3-8X resin is a polymeric (ar-vinylbenzyl) bis(2-aminoethyl) amine hydrochloride resin crosslinked with 8 weight percent of divinylbenzene.

Example 5

An aqueous salt solution was prepared to approximate a concentrated natural brine (80 weight percent of the water removed). It contained 15 percent sodium chloride and 0.05 percent potassium iodide. A quantity of 2 kg. of this salt solution was passed through a 1-inch column containing 40 g. of Dowex 1-2X resin, 50-100 mesh, with about 30 percent active bromine chloride complexed on the resin as the chlorobromate. The feed rate was 10 ml. per minute. The iodine was quantitatively removed as the polyiodide anion in the first 2-3 inches of the resin bed. The effluent was directed through another column containing Dowex 1-2X to complex the small amount of bromine chloride which dissociated from the halogenated resin. The effluent from the latter bed was 0.015 percent acid. The theoretical amount of iodine was recovered as sodium iodide after elution with aqueous 5 percent sodium hydroxide solution.

Example 6

The procedure of Example 5 was repeated with a bed of Dowex 1-2X, 50-100 mesh, resin in the polybromide form. The polybromide resin, equivalent to Br$_7$ (about 70 percent Br$_2$) was prepared by elution of the Dowex 1-2X resin column with excess amount of an aqueous solution containing 10 percent bromine and 15 percent sodium bromide. The results were similar to those of Example 5.

What is claimed is:

1. A method for separating and recovering iodine from an aqueous solution of an iodide salt by contacting said solution at 10° to 40° C. with an anion exchange resin in a polyhalide anionic form, said polyhalide anion having the formula X$_n^-$, wherein $n$ is an odd integer from 3 to 7 and X is a member of the group consisting of chlorine, bromine, iodine, and combinations thereof, no more than one atom of which polyhalide anion is iodine, whereby available reactive halogen oxidizes iodide ion to liberate iodine and the liberated iodine displaces corresponding halogen to give anion exchange resin polyiodide, and recovering iodine therefrom, said anion exchange resin in its normal form being a member of the group consisting of the halide salts of the strongly basic quaternary ammonium and weakly basic polyamine anion exchange resins.

2. A method for separating and recovering iodine from an aqueous solution of an iodide salt by feeding said solution at 10° to 40° C. to a water-immersed bed of an anion exchange resin in a polyhalide anionic form, said polyhalide anion having the formula X$_n^-$, wherein $n$ is an odd integer from 3 to 7 and X is a member of the group consisting of chlorine, bromine, iodine and combinations thereof, no more than one atom of which polyhalide anion is iodine, whereby available reactive halogen oxidizes iodide ion to liberate iodine, and the liberated iodine displaces corresponding halogen to give anion exchange resin polyiodide, and recovering iodine therefrom, said anion exchange resin in its normal form being a member of the group consisting of the halide salts of strongly basic quaternary ammonium and weakly basic polyamine anion exchange resins.

3. The method of claim 2 wherein the polyhalide anion is chlorobromate.

4. The method of claim 2 wherein the polyhalide anion is bromochlorate.

5. The method of claim 2 wherein the polyhalide anion is chloroiodate III.

6. The method of claim 2 wherein the polyhalide anion is a polybromide.

References Cited in the file of this patent

UNITED STATES PATENTS

| | | |
|---|---|---|
| 2,157,508 | Urbain et al. | May 9, 1939 |
| 2,591,573 | McBurney | Apr. 1, 1952 |
| 2,591,574 | McBurney | Apr. 1, 1952 |
| 2,614,099 | Bauman et al. | Oct. 14, 1952 |
| 2,945,746 | Shaw | July 19, 1960 |

OTHER REFERENCES

"Organolites," by H. Burrell, Ind. and Eng. Chem., vol. 30, No. 3, pages 358-359 (March 1938).